United States Patent
Chao et al.

(10) Patent No.: US 9,767,497 B1
(45) Date of Patent: Sep. 19, 2017

(54) DISTRIBUTOR BUSINESS POLICY DRIVEN CLOUD SERVICES INTEGRATION

(71) Applicant: International Business Machines Corporation, Armonk, NY (US)

(72) Inventors: Ching-Yun Chao, Austin, TX (US); William H. Lee, San Francisco, CA (US); Ikenna C. Osuji, Austin, TX (US); Ki H. Park, Cary, NC (US); Yan Xiao, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/279,407

(22) Filed: Sep. 28, 2016

(51) Int. Cl.
*G06Q 30/00* (2012.01)
*G06Q 30/06* (2012.01)

(52) U.S. Cl.
CPC ..... *G06Q 30/0609* (2013.01); *G06Q 30/0603* (2013.01); *G06Q 30/0633* (2013.01)

(58) Field of Classification Search
CPC ............ G06Q 30/0601–30/0645; G06Q 30/08
USPC .................... 705/26.1–27.2, 26.35
See application file for complete search history.

(56) References Cited

U.S. PATENT DOCUMENTS

| | | | |
|---|---|---|---|
| 7,209,892 B1* | 4/2007 | Galuten et al. ........ G06Q 30/00 705/26 |
| 2003/0028451 A1* | 2/2003 | Ananian ........... G06F 17/30867 705/26.42 |
| 2003/0163513 A1 | 8/2003 | Schaeck et al. |
| 2005/0125389 A1* | 6/2005 | Hazzard et al. ........ G06F 17/30 707/3 |

OTHER PUBLICATIONS

Nigel Cope Associate, C.E. (Apr. 7, 1999). Tesco to use 'class' system for customer discounts. The Independent Retrieved from https://search.proquest.com/.*

* cited by examiner

*Primary Examiner* — Matthew Zimmerman
*Assistant Examiner* — Katherine O'Sullivan
(74) *Attorney, Agent, or Firm* — VanLeeuwen & VanLeeuwen; David B. Woycechowsky

(57) ABSTRACT

An approach is provided that authenticates, at an on-line distributor, an end user that has connected to the distributor over a communications network. One or more sets of rules are sent from the distributor to one or more vendor sites. The distributor receives vendor product data pertaining to the vendor sites. The vendor product data received from the vendor sites is based on the sets of rules sent to the respective vendors. A product request is received at the distributor from the authenticated end user. The vendor product data received at the distributor is queried using a query that is based on the product request with the query resulting in a search result that is returned to the end user.

12 Claims, 8 Drawing Sheets

DISTRIBUTOR BUSINESS POLICY DRIVEN CLOUD SERVICES INTEGRATION

BACKGROUND OF THE INVENTION

Technical Field

This disclosure relates to distributor use of business policies with vendors in supporting distributor customers.

Description of Related Art

Customers demand cloud service distributors, providers, aggregators, and brokers to provide complete solutions instead of simply virtual machines and containers. It is difficult for a single vendor to deliver a complete suite of product and service offerings that are superior to all competitions or suitable to all business scenarios. A vendor may be strong at certain products and services, but otherwise not competitive on other areas of products and services. As used herein, the term "distributor(s)" is used to represent distributors, cloud service providers, aggregators, and brokers. Distributors build competitive solution bundles leveraging products and services from multiple vendors. Oftentimes, distributors wish to promote particular products or services from specific vendors due to business and/or technical reasons. Distributors therefore desire the flexibility to selectively enable and disable vendor product offerings. Distributors need the capability to "allow" only selected vendor products and services to appear on the market place.

One way to address the problem is to build a web front end at the distributors' market place for each of the vendors that suppresses undesirable vendor offerings. This approach is sometimes referred to as "distributor side filtering". In distributor side filtering, the distributor's web front explicitly specifies what vendor products to offer and what vendor products to exclude. APS (Application Packaging Standard) applications that are hosted on ODIN operation and business automation platforms are examples of distributor side filtering. An APS application is developed and provided by a vendor and the application can be configured to show or hide vendor products. Customers can only see allowed vendor products appear on such vendor APS application. As a concrete example, SoftLayer APS implements an exclusion list so that distributors are able to configure which vendor devices and services are offered to customers of that distribution channel. A challenge with this approach is that the actual ordering of vendor devices and services occurs at the distributor portal, rather than at the vendor portal. An APS application running on the distributor portal is needed to implement provisioning functions in order for customers to order vendor devices and services. Consequently, development of such an APS application is a complex task. It is often very difficult to configure a correct ordering process that provides a robust environment for a vendor with a rich portfolio and intricate product dependency relationships. This complexity results in higher cost to develop and maintain APS applications, and further results in higher cost to host a market place by the distributor. In addition, this challenge is not specific to any particular market platform such as ODIN, but is instead a general problem when dealing with other market platforms as well, such as other business automation platforms.

SUMMARY

An approach is provided that authenticates, at an on-line distributor, an end user that has connected to the distributor over a communications network. One or more sets of rules are sent from the distributor to one or more vendor sites. The distributor receives vendor product data pertaining to the vendor sites. The vendor product data received from the vendor sites is based on the sets of rules sent to the respective vendors. A product request is received at the distributor from the authenticated end user. The vendor product data received at the distributor is queried using a query that is based on the product request with the query resulting in a search result that is returned to the end user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
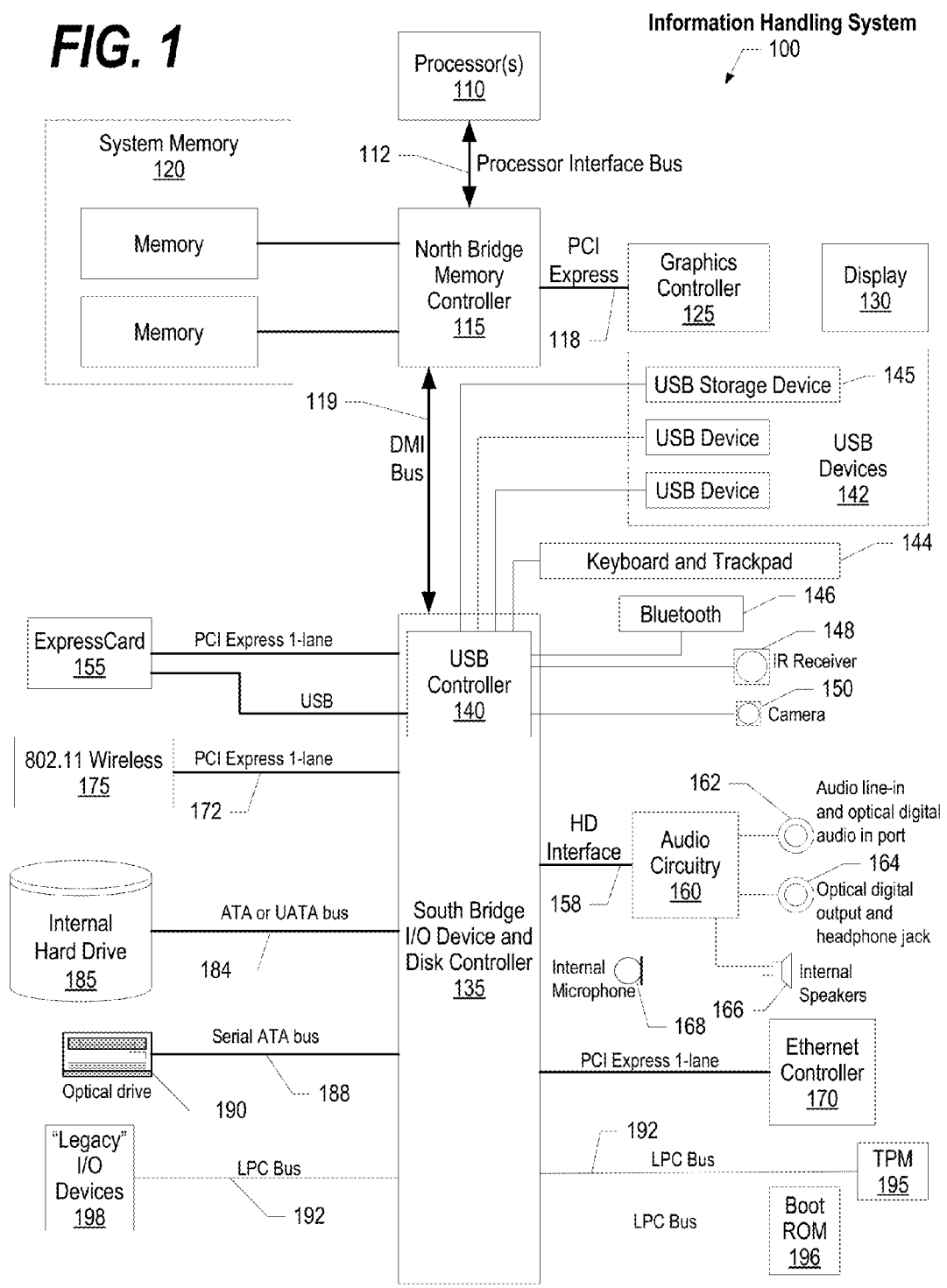
FIG. 1 depicts a block diagram of a processor and components of an information handling system.

FIGS. 1-8 show an approach that reduces the complexity faced by distributors by removing the need to develop distributor-side filters. In other words, this approach removes the need to re-implement vendor specific provisioning logic at the distributor's site. Distributors provide business value through offering customers selections of broad set of portfolios at competitive pricing and consolidated billing/accounting management. Vendors provide business value through offering competitive products and services. Vendors are better able to provision and manage their own products and services within the confines of the distributor's business rules, or filters. This approach provides a mechanism that enables distributors to market to their end users and provide integration with vendor products and services to provide the best from both sides to the distributor's customers. The approach allows vendor portals to manage the visibility of vendor products and services visibility to customers of distributors based on the distributors' business policy, referred to herein as "rules." The rules dictate which of the vendors' products and services should be made available to the end user customers with the rules being configured and managed by the distributor. Vendor portals are provided with the rules and are required to enforce the business rules provided by the distributor. In other words, conceptually the filter is defined by distributors with the filtering rules actually being enforced by the vendors. This involves propagating such rules, such as filters and discounting, from the distributor to the vendors.

In this approach, industry standards are utilized such as Security Assertion Markup Language (SAML), OpenID Connect, or OAuth2 protocols to pass the business rules, but other similar technology and protocols can be used as well. Security token and protocol standard such as SAML and OpenID Connect allows distributors to assert customer identity, credentials, and authorization data to vendors. Moreover, in this approach filtering rules are passed to vendors so that the vendors can control what products and services should be visible (made available) to the distributor's end user (customer). Customers can order, provision, and manage those products and services directly at vendor portal. Using standard protocols allows the vendor portal to be integrated with one or more distributors with one portal implementation. With this approach, there is no need to develop and duplicate vendor product ordering and provisioning capability at the distributor. Consequently, the approach helps reduce the development and maintenance cost for both distributors and for vendors. Customer account management, billing consolidation, and channel management can also be performed by distributors, with such processes being able to hide the actual identity of the distributor's end users from the vendors. Likewise, products, services, and resources are managed by vendors without a need to know the specific identity of the distributor's customers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
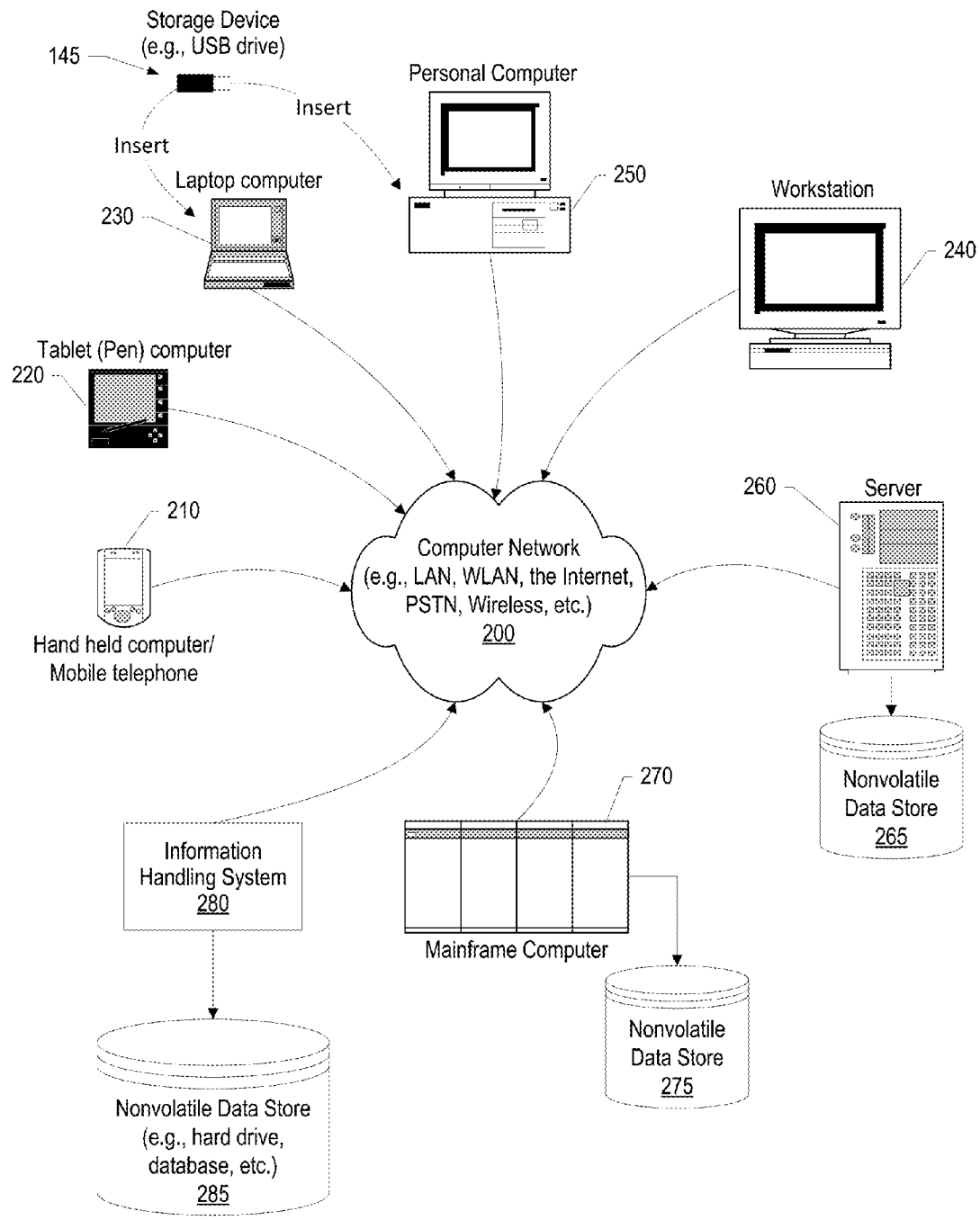
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
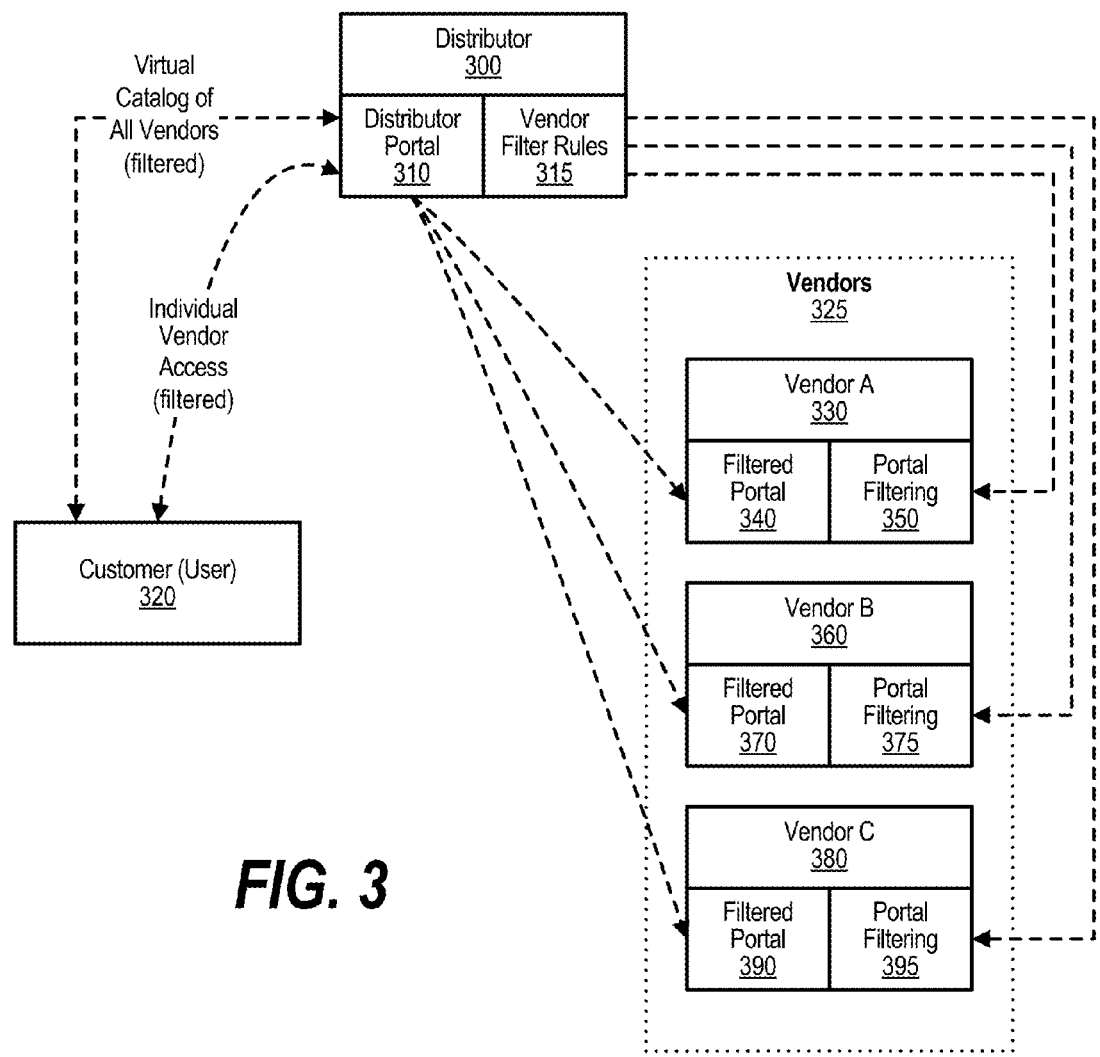
FIG. 3 is a diagram depicting aninteractions between a distributor, the distributor's customer, and any number of vendors.

FIG. 3 is a diagram depicting an interactions between a distributor, the distributor's customer, and any number of vendors. Distributor 300 in an on-line distributor that is accessed by a customer end user 320. The customer end user access distributor portal 310 that provides a virtual catalog of one or more vendors 325. Distributor 315 sends rules 315 to the vendors. The rules can be different for each of the vendors and can also be different based upon the customer end user that the distributor is servicing.

Distributor 300 receives requests from customer end user 320 and builds a virtual catalog of products offered by the various vendors based upon the customer end user's request and the filter rules sent to the various vendors with the rules filtering the products and services made available by each of the vendors to the customer end user. In the example shown, vendors 325 includes vendors A (330), B (360), and C (380).

Each of these vendors provide a portal (portals 340, 370, and 390, respectively) that can be accessed by the customer end user with the data provided on these portals also being filtered based upon the rules promulgated by the distributor. Each of the vendors has a portal filtering process (processes 350, 375, and 395, respectively) that handle the filtering of the respective portal product offerings based on the filters provided to the respective vendor.

For example, an excellent customer of the distributor might cause the distributor to allow vendor A to show products A, B, and C to the customer, however the distributor establishes a filter to prevent vendor A from showing this customer product D. Likewise, the filter rule sent to vendor B allows vendor B to show the customer products H, I, and J to the customer but not product K, and allows vendor C to show products W, X, and Y but not product Z to the customer. In addition, a discount can be part of the rule sent from the distributor to the vendors. For example, for the excellent customer, the distributor may have the rule being a twenty percent discount. The virtual catalog generated by the distributor for the excellent customer would include products A, B, and C from vendor A, products H, I, and J from vendor B, and products W, X, and Y from vendor C. In addition, the prices for the products would reflect the discount rate. The discount rate could be different for each product or for each vendor, depending on the rules promulgated by the distributor.

The same distributor could have different rules for a mediocre customer that, for example, allows the vendors to show the customer a different set of products (e.g., fewer products than the excellent customer was able to view, etc.) and might include a lesser discount, such as a five percent discount instead of the twenty percent discount. In this example, the mediocre customer might view a virtual catalog that only includes products A and B from vendor A, product H from vendor B, and products X and Y from vendor C.

As shown in the diagram with the connections between customer end user 320 and distributor 300, the customer can access a virtual catalog of all vendors with a filtered list of products provided to the customer by the distributor, as described above. In addition, if the customer requests product details not found in the virtual catalog or that have not been obtained by the distributor, then individual vendor access can be provided with the customer end user's request being re-directed to the specific vendor with a security token or other identifier that identifies the type, or class, of customer to the vendor without providing the vendor with the actual identity of the customer. Because the vendor is provided with the type, or class, of the customer, the vendor is able to provide a filtered portal of the vendor's products and prices in accordance with the rules set forth by the distributor. In this manner, the customer end user is able to receive any needed information pertaining to the vendor's products without burdening the distributor with retrieving such information, but at the same time complying with the distributor's rules regarding the vendor's products, pricing, and other information made available to this customer by the vendor.

Figure 4:
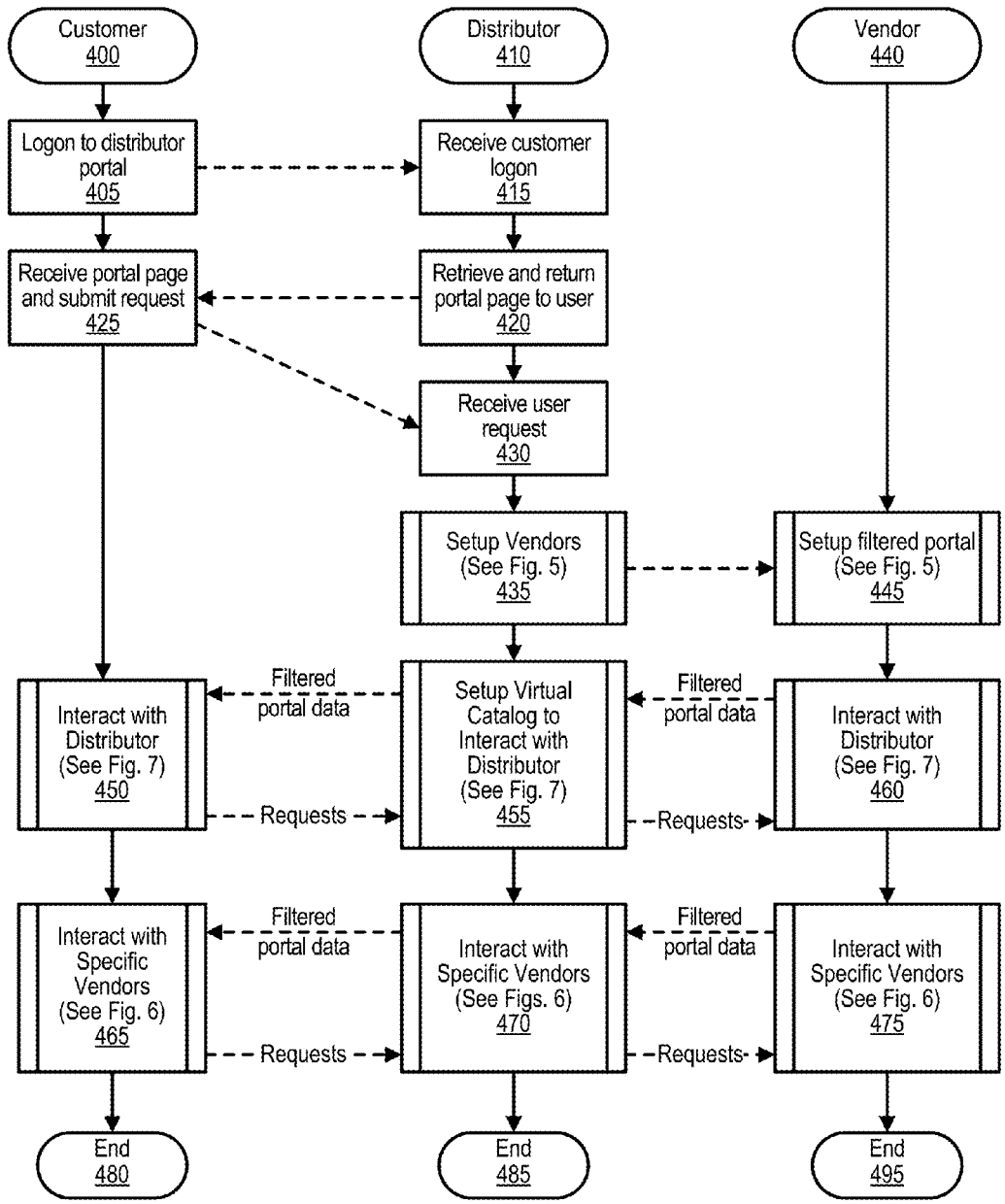
FIG. 4 is a flowchart showing high-level steps taken by a processes performed by a distributor, the distributor's customer, and any number of vendors.

FIG. 4 is a flowchart showing high-level steps taken by a processes performed by a distributor, the distributor's customer, and any number of vendors. Customer processing is shown commencing at 400. At step 405, the customer end user process logons onto distributor portal. Distributor processing is shown commencing at 410. At step 415, the distributor process receives customer logon request. At step 420, the distributor process retrieves and returns the portal page to the end user after authenticating the end user at the distributor site.

At step 425, the end user process receives the portal page from the distributor and submits a request, such as a request for available products. At step 430, the distributor process receives the end user request. At predefined process 435, the distributor process performs the Setup Vendors routine (see FIG. 5 and corresponding text for processing details). This predefined process sets up a virtual catalog that will be used by the end user to access product data from one or more vendors. Vendor processing is shown commencing at 440. At predefined process 445, the vendor process performs the Setup filtered portal routine (see FIG. 5 and corresponding text for processing details). This vendor predefined process applies the rules provided by the distributor to provide, or show, those products and details, such as discounts, that comply with the rules provided by the distributor.

Figure 7:
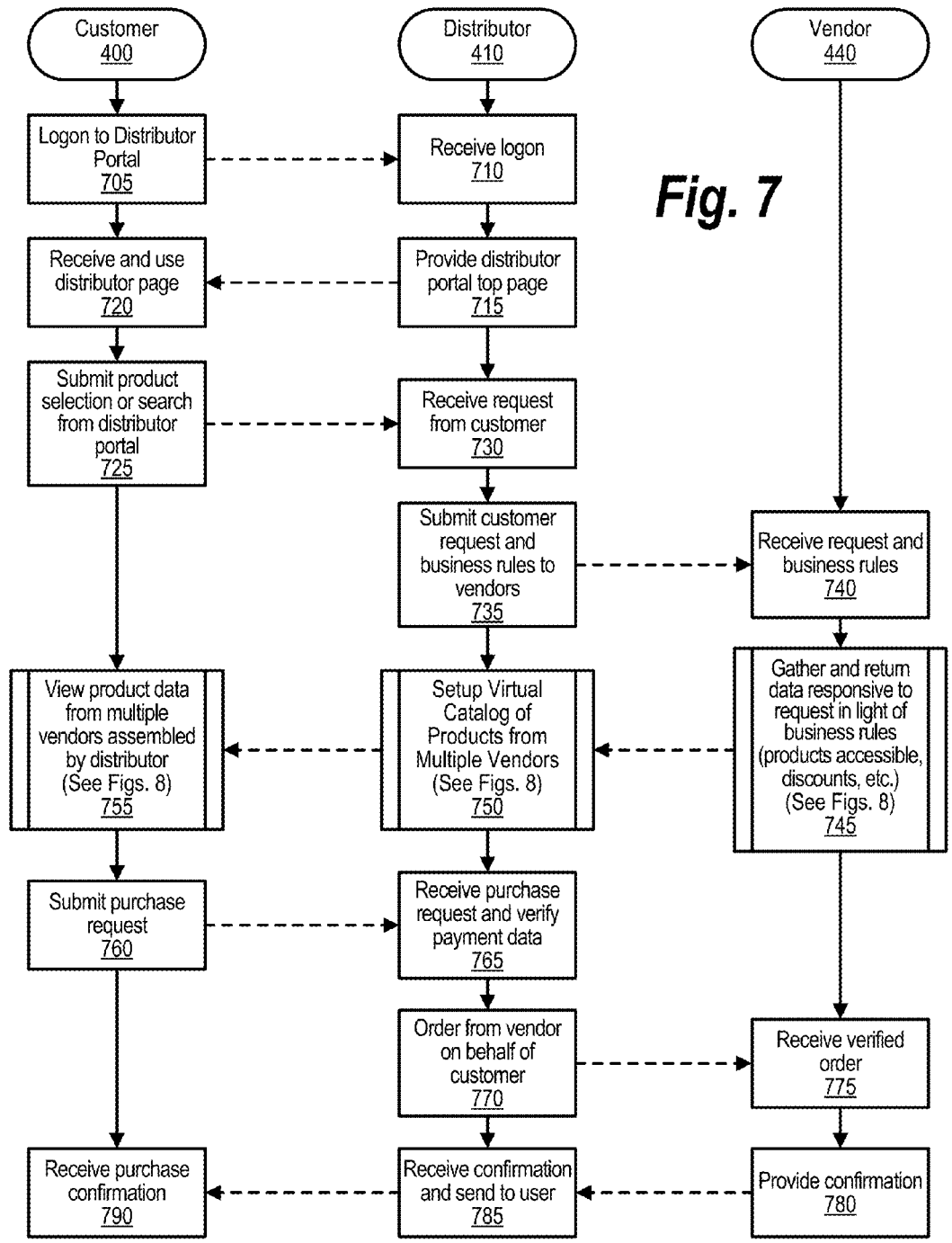
FIG. 7 is a flowchart showing steps taken between the customer and the distributor and between the distributor and multiple vendors to allow the customer to view products and services of multiple vendors that have been assembled by the distributor.

At predefined process 450, the end user process performs the Interact with Distributor routine (see FIG. 7 and corresponding text for processing details). This end user predefined process allows the end user to utilize the virtual catalog to select and view a filtered set of product data from multiple vendors based upon the rules set forth by the distributor.

At predefined process 455, the distributor process performs the Setup Virtual Catalog to Interact with Distributor routine (see FIG. 7 and corresponding text for processing details). This distributor predefined process establishes the virtual catalog that is utilized by the end user by processing data received from one or more vendors.

At predefined process 460, the vendor process performs the Interact with Distributor routine (see FIG. 7 and corresponding text for processing details). This process applies the rules received by the vendor from the distributor and responds with vendor product data that comply with the rules promulgated by the distributor.

Figure 6:
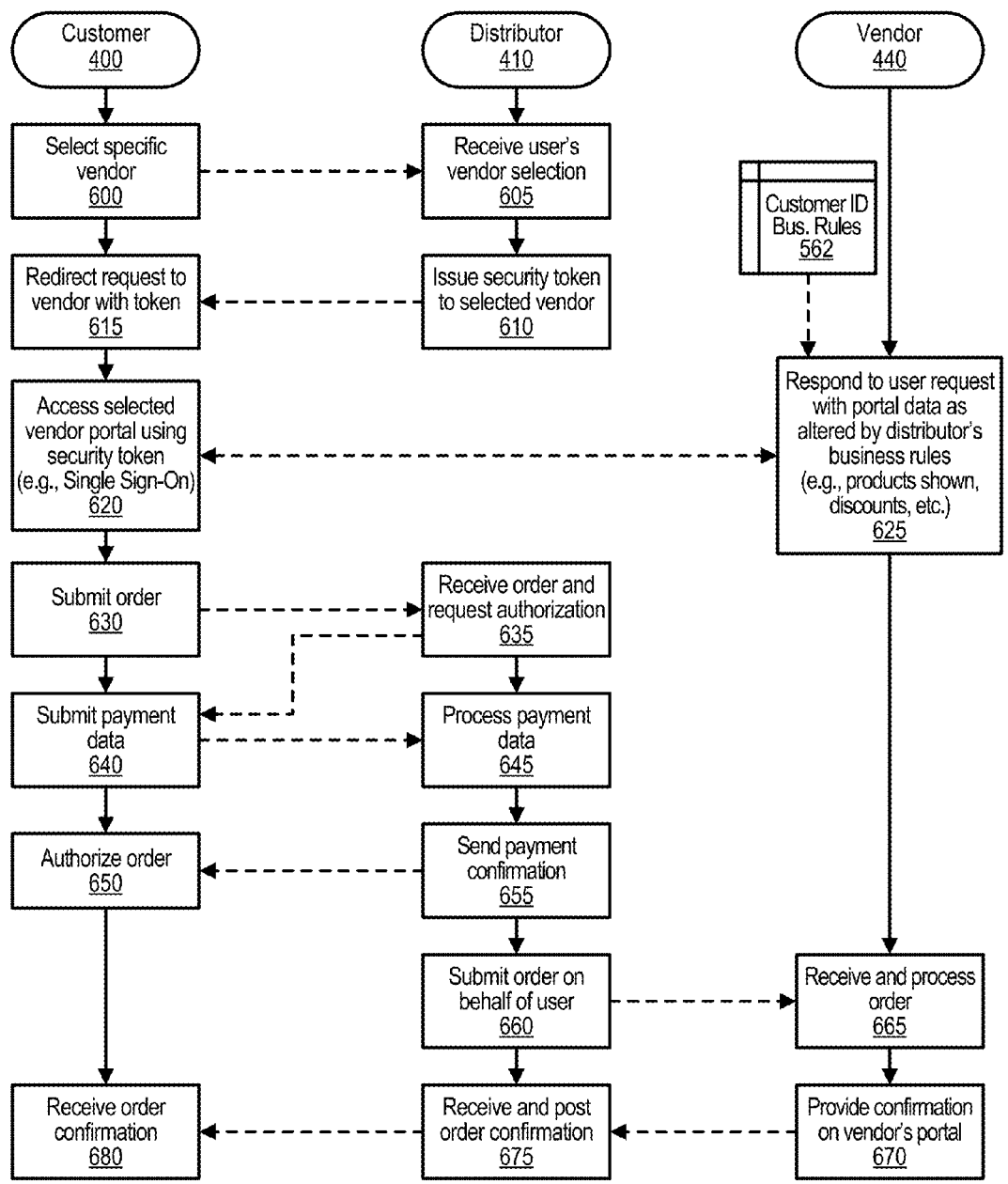
FIG. 6 is a flowchart showing steps taken between the customer, the distributor, and the vendor to allow the customer to interact with a specific vendor.

At predefined process 465, the end user process performs the Interact with Specific Vendors routine (see FIG. 6 and corresponding text for processing details). If the end user requests data that is not available at the distributor or at the virtual catalog generated by the distributor, then this predefined process allows the end user to access data from the vendor while having the vendor still comply with the distributor's rules when showing the end user the data.

At predefined process 470, the distributor process performs Interact with Specific Vendors routine (see FIG. 6 and corresponding text for processing details). This distributor routine allows the distributor to create a security token that is used by the end user to access the vendor website without divulging the identity of the end user to the vendor while providing the end user with data from the vendor that complies with the rules promulgated by the distributor.

At predefined process 475, the vendor process performs the Interact with Specific Vendors routine (see FIG. 6 and corresponding text for processing details). This routine allows the vendor portal, or website, to respond to an end user request, such as a request for further data about a product, without the vendor being able to identify the end user but still having the vendor comply with the rules set forth by the distributor. The end user processing is shown ending at 480 with the distributor processing and vendor processing shown ending at 485 and 495, respectively.

Figure 5:
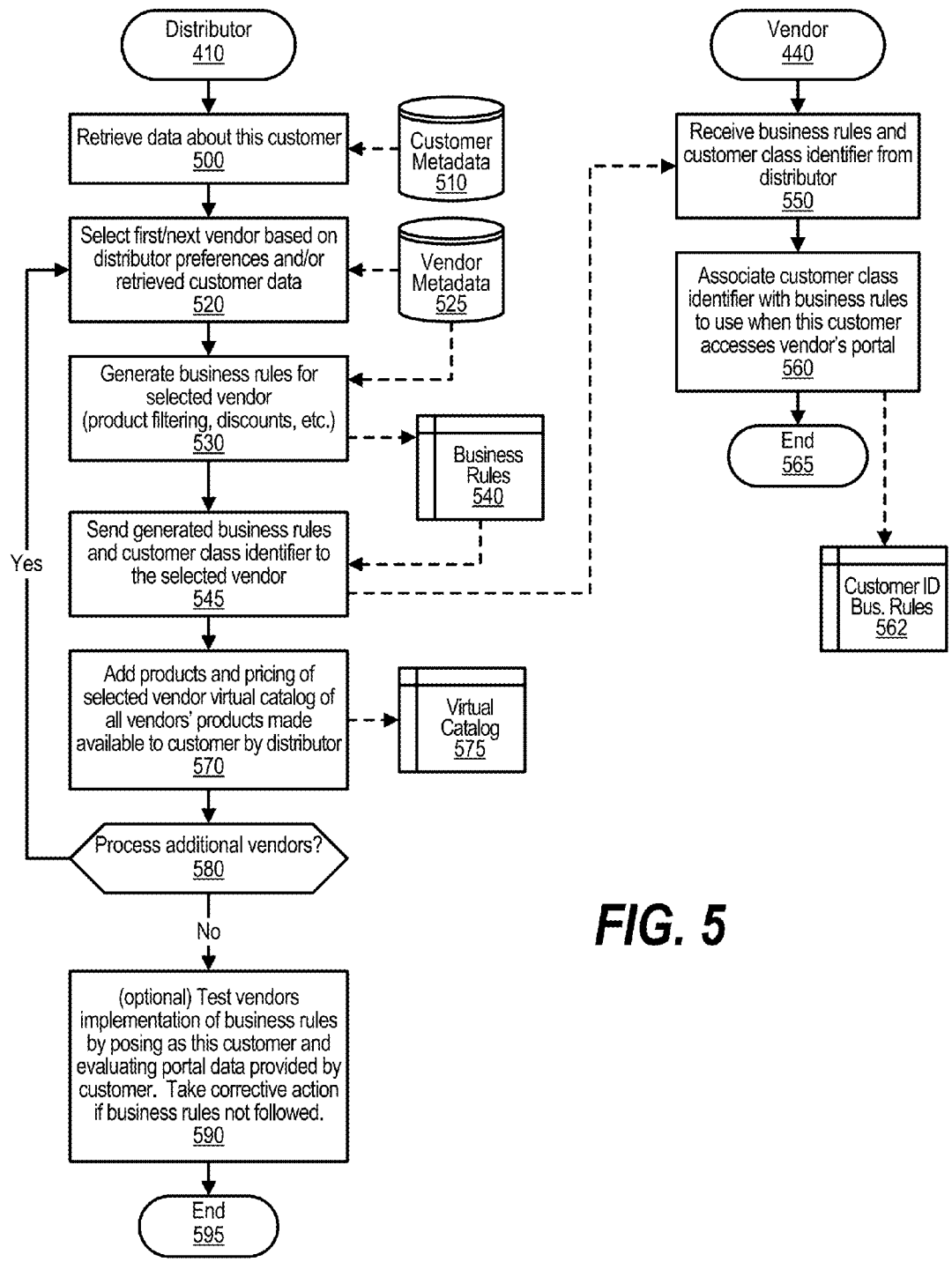
FIG. 5 is a flowchart showing steps taken between a distributor and a vendor to setup business filtering by the distributor that will be performed at the vendor.

FIG. 5 is a flowchart showing steps taken between a distributor and a vendor to setup business filtering by the distributor that will be performed at the vendor. Distributor processing is shown commencing at 410 whereupon, at step 500, the distributor process retrieves data about this end user customer. The end user customer data is retrieved from data store 510. At step 520, the distributor process selects the first vendor based on the distributor preferences and/or the retrieved customer data. The vendor data is retrieved from data store 525.

At step 530, the distributor process generates the rules that will apply to the selected vendor, such as what products this vendor can show this customer, any product discounts, and any other filtering of the vendor's data. The rules are stored in memory area 540. At step 545, the id process sends the generated rules to the selected vendor. In addition, the distributor can also send the vendor a customer class, or type, identifier with this identifier used by the vendor to use the correct rules if the end user customer accesses the vendor portal directly, such as if the end user requests data not available from the distributor. Vendor processing is shown commencing at 440 whereupon, at step 550, the process receives the rules established by the distributor as well as any class or type identifier that is used to identify the type, or class, of the customer without divulging the actual end user identity to the vendor. At step 560, the vendor process associates the end user customer class identifier with the rules received from the distributor in memory area 562. This association is used by the vendor to apply the correct rules when this end user customer accesses the vendor's portal directly, such as if the end user requests product data not available from the distributor portal. Vendor processing thereafter ends at 565.

Returning to distributor processing, at step 570, the distributor process adds the products and pricing of selected vendor to the virtual catalog of all vendors' products made available to customer by distributor. The virtual catalog is stored in memory area 575. The product data received from the vendor complies with the distributor rules sent to the vendor. The distributor process determines whether there are additional vendors to process (decision 580). If there are additional vendors to process, then decision 580 branches to the 'yes' branch which loops back to step 520 to retrieve and process the next vendor as described above. This looping continues until all of the vendors have been processed, at which point decision 580 branches to the 'no' branch exiting the loop.

In one embodiment, as shown in step 590, the distributor process tests the vendors' implementations of the rules promulgated by the vendor by posing as this customer and evaluating portal data provided by customer from the vendor. In this embodiment, corrective action can be taken if the distributor's rules are not followed by one or more of the vendors. The distributor processing shown in FIG. 5 thereafter ends at 595.

FIG. 6 is a flowchart showing steps taken between the customer, the distributor, and the vendor to allow the customer to interact with a specific vendor. Customer (end user) processing is shown commencing at 400 whereupon, at step 600, the end user process selects a specific vendor, such as a specific vendor product shown on a virtual catalog provided by the distributor. Distributor processing is shown commencing at 410 whereupon, at step 605, the distributor process receives the end user's vendor selection. At step 610, the distributor process issues a security token to the selected vendor and this security token is returned to the end user.

Returning to end user processing, at step 615, the end user process redirects the end user's request, such as a request for product details, to the selected vendor with the security token. At step 620, the end user process accesses the selected vendor portal using security token (e.g., Single Sign-On), such as a request for product details from a selected vendor portal. Vendor processing is shown commencing at 440 whereupon, at step 625, the vendor process responds to the end user request with vendor portal data as filtered by the distributor's rules (e.g., which vendor products shown, discounts available, etc.). The vendor determines which rules to apply by finding the rules and the association with the end user's class identifier with the class identifier being used to identify the type, or class, of the end user without divulging the actual identity of the end user.

Returning to end user processing, at step 630, the end user process submits an order for one of the vendor's products. Returning to distributor processing, at step 635, the distributor process receives the order from the end user and requests authorization of the order from the end user. At step 640, the end user process receives the request from the distributor and submits payment data. At step 645, the distributor process receives and processes the payment data from the end user. At step 650, the end user process authorizes order and at step 655 the distributor process sends payment confirmation to the end user. At step 660, the distributor process submits the order to the selected vendor on behalf of the end user. At step 665, the vendor process receives and process order from the distributor. At step 670, the vendor process provides confirmation of the order on the vendor's portal. At step 675, the distributor process receives and posts the order confirmation on the distributor portal. At step 680, the end user process receives the order confirmation from the distributor portal.

FIG. 7 is a flowchart showing steps taken between the customer and the distributor and between the distributor and multiple vendors to allow the customer to view products and services of multiple vendors that have been assembled by the distributor. End user processing commences at 400 whereupon, at step 705, the end user process logs onto to the Distributor Portal. Distributor processing commences at 410 whereupon, at step 710, the distributor process receives the logon request from the end user. At step 715, the distributor process provides the distributor portal top page to the end user in response to a successful logon by the end user. At step 720, the end user process receives and uses the distributor page.

At step 725, the end user process submits a product selection or search from the distributor portal. At step 730, the distributor process receives the product selection or search request from the end user. At step 735, the distributor process submits the customer request and rules to one or more vendors. Vendor processing commences at 440 whereupon, at step 740, the vendor process receives the request and the rules from the distributor. At predefined process 745, the vendor process performs a routine to gather and return data responsive to the request that also complies with the rules set forth by the distributor (see FIG. 8 and corresponding text for processing details).

Figure 8:
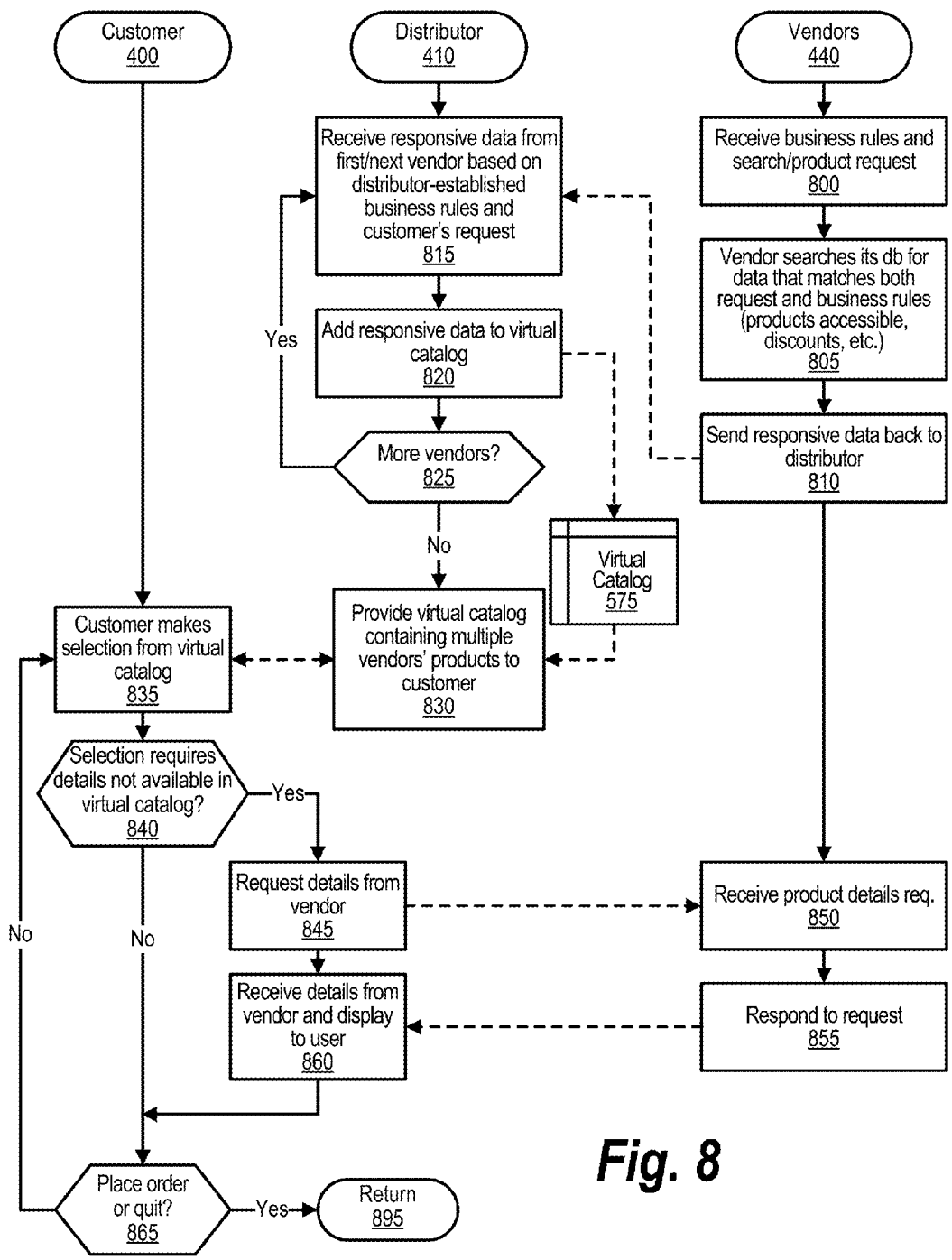
FIG. 8 is a flowchart showing steps taken between the distributor and the vendors to setup a virtual catalog of products from the multiple vendors with the products being provided according to business rules promulgated by the distributor.

At predefined process 750, the distributor process performs the setup virtual catalog of products routine that builds a virtual catalog from one or more vendors with the product data received from such vendors complying with the rules set forth by the distributor (see FIG. 8 and corresponding text for processing details).

At predefined process 755, the end user process performs the view product data from multiple vendors assembled by the distributor routine, with the vendors and products viewed being controlled by the distributor and the rules set forth by the distributor (see FIG. 8 and corresponding text for processing details). At step 760, the end user process submits purchase request for one or more products. The purchase request is submitted to the distributor rather than the vendor. At step 765, the distributor process receives the purchase request from the end user and verifies payment data from the end user.

At step 770, the distributor process orders the product from the vendor on behalf of the end user. At step 775, the vendor process receives the verified order from the distributor. At step 780, the vendor process provides confirmation of the order to the distributor. At step 785, the distributor process receives the confirmation from the vendor and sends the confirmation to the end user. At step 790, the end user process receives the purchase confirmation and displays the confirmation to the customer.

FIG. 8 is a flowchart showing steps taken between the distributor and the vendors to setup a virtual catalog of products from the multiple vendors with the products being provided according to business rules promulgated by the distributor. Vendor processing commences at 440 whereupon at step 800, the vendor process receives rules from the distributor and a request, such as a search or product request. At step 805, the vendor process searches its database for vendor data that matches the request and complies with the rules received from the distributor. For example, a search request might result in products A, B, and C of the vendor, however the rules received from the distributor prohibit the vendor from providing data regarding product C, in which case only data regarding products A and B would be returned. At step 810, the vendor process sends responsive data back to the distributor.

Distributor commences at 410 whereupon, at step 815, the distributor process receives responsive data from the first vendor based on the distributor-established rules and the customer's received request. At step 820, the distributor process adds the responsive data to virtual catalog that is stored in memory area 575. The distributor process determines as to whether there are more vendors to process (decision 825). If there are more vendors to process, then decision 825 branches to the 'yes' branch which loops back to step 815 to receive and process data from the next vendor as described above. This looping continues until there are no more vendors to process, at which point decision 825 branches to the 'no' branch exiting the loop. At step 830, the distributor process provides the completed virtual catalog containing multiple vendors' products to the end user customer.

End user processing commences at 400, whereupon at step 835, the end user process receives a selection from the user that is using the virtual catalog provided by the distributor. The process determines whether the selection made by the user requires details that are not available at the distributor or in the virtual catalog (decision 840). If the selection made by the user requires details that are not available at the distributor or in the virtual catalog, then decision 840 branches to the 'yes' branch to retrieve the data from the vendor portal using steps 845 and 850. On the other hand, if the selection made by the user pertains to data available at the distributor or from the virtual catalog, then decision 840 branches to the 'no' branch whereupon such data is retrieved from the virtual catalog and shown to the user.

At step 845, the end user process requests details from vendor, such as by using a redirect from the distributor to the vendor with a security token provided by the distributor. At step 850, the vendor process receives the product details request from the user with the request not identifying the specific end user that is making the request. At step 855, the vendor process responds to request by retrieving the requested data and also complying with the rules set forth by the distributor, such as pertaining to which products of the vendors are available to this end user and what discounts are available. At step 860, the end user process receives the details from the vendor and displays the received data to the end user. The end user process determines whether the user is placing an order or quitting the process (decision 865). If the user is not placing an order and is not quitting the process, then decision 865 branches to the 'no' branch which loops back to step 835 to receive and process the next selection from the user. This looping continues until the user is either placing an order or quitting the process, at which point decision 865 branches to the 'yes' branch at which point processing returns to the calling routine (see FIG. 7).

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   authenticating, at an on-line distributor, an end user that has connected to the distributor over a communications network;
   sending one or more sets of rules from the distributor to a plurality of vendor sites, wherein each of the sets of rules correspond to one or more end users;
   receiving, at the distributor, vendor product data from the plurality of online vendors, wherein the vendor product data received from the online vendors is based on the one or more sets of rules corresponding to the authenticated end user;
   in response to receiving, at the distributor, the vendor product data, receiving, at the distributor, an initial request for a product from the authenticated end user;
   in response to the request, automatically generating a customized virtual catalog corresponding to the authenticated end user from the vendor product data that was received at the distributor from the plurality of vendors based on the rules corresponding to the authenticated end user;
   generating, by the distributor, a security token which authenticates the end user to the vendor while inhibiting identification of the authenticated end user to the online vendor; and
   sending the customized virtual catalog to the end user over the communications network, wherein the customized virtual catalog includes a plurality of product offering selections that, when selected, allow the end user to obtain a set of product details corresponding to a selected product from the corresponding online vendor using the security token generated by the distributor.

2. The method of claim 1 wherein at least one of the sets of rules filters out or more product offerings provided by at least one of the vendors, the method further comprising:
   receiving an order request at the distributor from the authenticated end user, wherein the order request corresponds to a selected product that was included in the virtual catalog; and
   submitting an order to a selected one of the plurality of vendors that corresponds to the selected product on behalf of the authenticated end user, wherein the submission inhibits identification of the authenticated end user to the selected.

3. The method of claim 1 further comprising:
   sending, from the distributor, the sets of rules to the one or more vendors, wherein a different one of the sets of rules is sent to each of the one or more vendors, and wherein the sets of rules provide filters pertaining to a set of product data to be returned by the one or more vendors;
   receiving, at the distributor, responsive data from the one or more vendors, wherein the responsive data complies with the rules sent to each of the respective vendors;
   building, at the distributor, a virtual catalog from the received responsive data, wherein the virtual catalog includes the sets of product data returned from each of the vendors; and
   providing, by the distributor, the virtual catalog to the end user.

4. The method of claim 3 further comprising:
   receiving, from the end user, a product selection pertaining to a selected one of the vendors with product data included in the virtual catalog;
   in response to identifying that a set of details responsive to the product selection were received by the distributor from the selected vendor:
   retrieving the set of details from a data store at the distributor; and
   responding to the end user's product selection with the retrieved set of details; and
   in response to identifying that details responsive to the product selection are not available at the distributor:
   requesting the set of details from the selected vendor, wherein the requesting inhibits identification of the end user.

5. The method of claim 1 further comprising:
   authenticating the end user using a Single Sign-On protocol that generates the security token.

6. The method of claim 5 further comprising:
   receiving an order pertaining to a selected product provided by a selected one of the vendors; and
   ordering, at the distributor, the selected product for the end user using the security token, wherein an identity of the end user is not divulged to the selected vendor during the ordering.

7. An information handling system comprising:
   one or more processors;
   a memory coupled to at least one of the processors; and a set of computer program instructions stored in the memory and executed by at least one of the processors in order to perform actions comprising:

authenticating, at an on-line distributor, an end user that has connected to the distributor over a communications network;

sending one or more sets of rules from the distributor to a plurality of vendor sites, wherein each of the sets of rules correspond to one or more end users;

receiving, at the distributor, vendor product data from the plurality of online vendors, wherein the vendor product data received from the online vendors is based on the one or more sets of rules corresponding to the authenticated end user;

in response to receiving, at the distributor, the vendor product data, receiving, at the distributor, an initial request for a product from the authenticated end user;

in response to the request, automatically generating a customized virtual catalog corresponding to the authenticated end user from the vendor product data that was received at the distributor from the plurality of vendors based on the rules corresponding to the authenticated end user;

generating, by the distributor, a security token which authenticates the end user to the vendor while inhibiting identification of the authenticated end user to the online vendor; and sending the customized virtual catalog to the end user over the communications network, wherein the customized virtual catalog includes a plurality of product offering selections that, when selected, allow the end user to obtain a set of product details corresponding to a selected product from the corresponding online vendor using the security token generated by the distributor.

8. The information handling system of claim 7 wherein at least one of the sets of rules filters out one or more product offerings provided by at least one of the vendors, the actions further comprising:

receiving an order request at the distributor from the authenticated end user, wherein the order request corresponds to a selected product that was included in the virtual catalog; and submitting an order to a selected one of the plurality of vendors that corresponds to the selected product on behalf of the authenticated end user, wherein the submission inhibits identification of the authenticated end user to the selected.

9. The information handling system of claim 7 wherein the actions further comprise:

sending, from the distributor, the sets of rules to the one or more vendors, wherein a different one of the sets of rules is sent to each of the one or more vendors, and wherein the sets of rules provide filters pertaining to a set of product data to be returned by the one or more vendors;

receiving, at the distributor, responsive data from the one or more vendors, wherein the responsive data complies with the rules sent to each of the respective vendors;

building, at the distributor, a virtual catalog from the received responsive data, wherein the virtual catalog includes the sets of product data returned from each of the vendors; and providing, by the distributor, the virtual catalog to the end user.

10. The information handling system of claim 9 wherein the actions further comprise:

receiving, from the end user, a product selection pertaining to a selected one of the vendors with product data included in the virtual catalog;

in response to identifying that a set of details responsive to the product selection were received by the distributor from the selected vendor:

retrieving the set of details from a data store at the distributor; and responding to the end user's product selection with the retrieved set of details; and in response to identifying that details responsive to the product selection are not available at the distributor:

requesting the set of details from the selected vendor, wherein the requesting inhibits identification of the end user.

11. The information handling system of claim 7 wherein the actions further comprise:

authenticating the end user using a Single Sign-On protocol that generates the security token.

12. The information handling system of claim 11 wherein the actions further comprise:

receiving an order pertaining to a selected product provided by a selected one of the vendors; and ordering, at the distributor, the selected product for the end user using the security token, wherein an identity of the end user is not divulged to the selected vendor during the ordering.

* * * * *